United States Patent
Beck et al.

(10) Patent No.: US 11,121,864 B1
(45) Date of Patent: Sep. 14, 2021

(54) SECURE PRIVATE KEY DISTRIBUTION BETWEEN ENDPOINT INSTANCES

(71) Applicant: International Business Machines Corporation, Armonk, NY (US)

(72) Inventors: Michael Beck, Bad Teinach-Zavelstein (DE); Martin Smolny, Boeblingen (DE); Thomas Dürr, Magstadt (DE); Georg Ochs, Moetzingen (DE); Gerald Francis McBrearty, Austin, TX (US); Stephen SooHoo, Round Rock, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/818,534

(22) Filed: Mar. 13, 2020

(51) Int. Cl.
- *H04L 29/06* (2006.01)
- *H04L 9/08* (2006.01)
- *H04L 9/30* (2006.01)

(52) U.S. Cl.
CPC ............ *H04L 9/083* (2013.01); *H04L 9/0894* (2013.01); *H04L 9/3073* (2013.01)

(58) Field of Classification Search
None
See application file for complete search history.

(56) References Cited

U.S. PATENT DOCUMENTS 7,500,272 B2 * 3/2009 Wheeler .................. G06F 21/32
713/171
7,523,490 B2 * 4/2009 Guo ........................ G06F 21/33
713/168

(Continued)

FOREIGN PATENT DOCUMENTS

CN 109428725 A 3/2019
CN 109600224 A 4/2019

(Continued)

OTHER PUBLICATIONS

Anonymous, "Mechanism to support single certificate for different public keys in Cloud Deployments," IP.com Prior Art Database Technical Disclosure, IP.com No. IPCOM000244693D, Jan. 6, 2016, 5 pages.

(Continued)

*Primary Examiner* — Maung T Lwin
(74) *Attorney, Agent, or Firm* — Jorge R. Maranto

(57) ABSTRACT

A method, a computer program product, and a system for distributing a private signature key between authorization instances. The method includes registering a plurality of authorization instances in a configuration file and generating host instance key pairs by each of the authorization instances. The method also includes storing the public host keys in the shared database and electing one of the authorization instances to be a signature key leader instance. The method includes generating, by the signature key leader instance, a signature key pair. The signature key pair includes a public signature key and a private signature key. The method also includes storing the public signature key in the shared database and transmitting an encrypted private signature key to a requesting authorization instance of the authorization instances. The method further includes decrypting the encrypted private signature key using the private host key generated by the requesting authorization instance.

20 Claims, 7 Drawing Sheets

(56) References Cited

U.S. PATENT DOCUMENTS

| | | | |
|---|---|---|---|
| 7,657,738 B2* | 2/2010 | Canard | G06Q 20/383 |
| | | | 713/156 |
| 8,316,237 B1* | 11/2012 | Felsher | H04L 9/0825 |
| | | | 713/171 |
| 8,464,347 B2* | 6/2013 | Maeda | G06F 21/57 |
| | | | 726/25 |
| 10,250,572 B2 | 4/2019 | Mohamed | |
| 10,333,903 B1 | 6/2019 | Campagna | |
| 10,762,197 B1 | 9/2020 | Yu | |
| 10,778,653 B2 | 9/2020 | Atta | |
| 10,853,477 B2 | 12/2020 | Shirakawa | |
| 10,977,362 B2 | 4/2021 | Yu | |
| 2011/0058673 A1 | 3/2011 | Zheng et al. | |
| 2018/0254890 A1 | 9/2018 | Fiege et al. | |
| 2019/0312851 A1 | 10/2019 | Campagna | |
| 2020/0021448 A1* | 1/2020 | Chumbley | H04L 9/3271 |

FOREIGN PATENT DOCUMENTS

| | | |
|---|---|---|
| CN | 110088742 A | 8/2019 |
| WO | 2019120317 A2 | 6/2019 |

OTHER PUBLICATIONS

Mell et al., "The NIST Definition of Cloud Computing", Recommendations of the National Institute of Standards and Technology, Special Publication 800-145, Sep. 2011, 7 pages.
PCT/IB2021/051090, International filing date Feb. 10, 2021, International Search Report and Written Opinion dated May 18, 2021.

* cited by examiner

SECURE PRIVATE KEY DISTRIBUTION BETWEEN ENDPOINT INSTANCES

BACKGROUND

The present disclosure relates to private key distribution, and more specifically, to providing private key distribution between endpoint instances used for generating and validating access tokens.

Web Application Programming Interfaces (API) can impose authorization requirements on users before providing access to its services and resources. Web APIs can use authorization endpoints to generate access tokens for users with verified credentials. In each subsequent request, the user can provide the access token to gain access to routes, services, and resources offered by the Web API. These access tokens can be in the form of a JavaScript Object Notation (JSON) web token (JWT). A JWT can include a header, a payload, and a signature. The header contains metadata about the type of token being used and the cryptographic algorithms used to secure its contents. The payload can include a set of claims, which are statements about the permissions that should be allowed. The signature can be used to validate the token is trustworthy and to ensure that they have not been tampered with.

A service cluster is a group of computers that support server applications and act as a single system. The Web API can be deployed within a service cluster to distribute traffic amongst the various computers within the cluster. The traffic distribution can assist in load balancing, offer high-availability, and provide lower latency over traditional server implementations.

SUMMARY

Embodiments of the present disclosure include a computer-implemented method for distributing a private signature key between authorization instances. The computer-implemented method includes registering a plurality of authorization instances in a configuration file. The authorization instances participating in a common service. The common service being access token generation and validation. The computer-implemented method further includes generating host instance key pairs by each of the authorization instances. Each of the host instance key pairs includes a public host key and a private host key. The computer-implemented method also includes storing the public host keys in the shared database and electing one of the authorization instances to be a signature key leader instance. The computer-implemented method includes generating, by the signature key leader instance, a signature key pair. The signature key pair includes a public signature key and a private signature key. The computer-implemented method also includes storing the public signature key in the shared database and transmitting an encrypted private signature key to a requesting authorization instance within the common service of the authorization instances. The encrypted private signature key is encrypted using the public host key corresponding to the requesting authorization instance. The computer-implemented method further includes decrypting the encrypted private signature key using the private host key generated by the requesting authorization instance.

Further embodiments of the present disclosure include a computer program product for distributing a private signature key between authorization instances, which can include a computer-readable storage medium having program instruction embodied therewith, the program instruction executable by a processor to cause the processor to perform a method. The method includes registering a plurality of authorization instances in a configuration file. The authorization instances participate in a common service. The common service being access token generation and validation. The method further includes generating host instance key pairs by each of the authorization instances. Each of the host instance key pairs includes a public host key and a private host key. The method also includes storing the public host keys in the shared database and electing one of the authorization instances to be a signature key leader instance. The method includes generating, by the signature key leader instance, a signature key pair. The signature key pair includes a public signature key and a private signature key. The method also includes storing the public signature key in the shared database and transmitting an encrypted private signature key to a requesting authorization instance within the common service of the authorization instances. The encrypted private signature key is encrypted using the public host key corresponding to the requesting authorization instance. The method further includes decrypting the encrypted private signature key using the private host key generated by the requesting authorization instance.

Additional embodiments are directed to a private key distribution system for distributing a private signature key between authorization instances configured to perform the method described above. The present summary is not intended to illustrate each aspect of, every implementation of, and/or every embodiment of the present disclosure

BRIEF DESCRIPTION OF THE DRAWINGS

These and other features, aspects, and advantages of the embodiments of the disclosure will become better understood with regard to the following description, appended claims, and accompanying drawings where:

Figure 1:
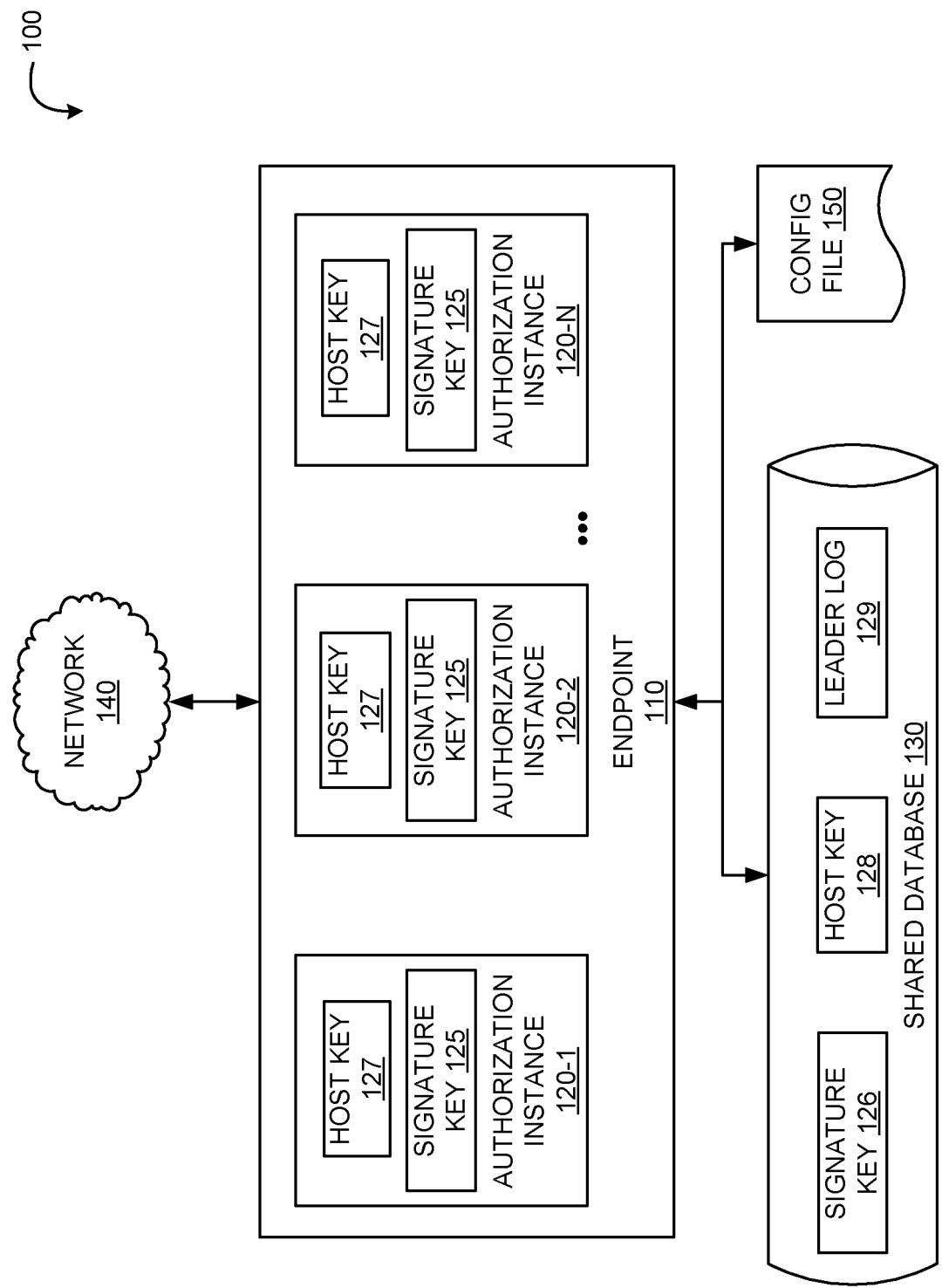
FIG. 1 is a block diagram illustrating a private key distribution system, in accordance with embodiments of the present disclosure.

While the present disclosure is amenable to various modifications and alternative forms, specifics thereof have been shown by way of example, in the drawings and will be described in detail. It should be understood, however, that the intention is not to limit the particular embodiments described. On the contrary, the intention is to cover all modifications, equivalents, and alternatives falling within the scope of the present disclosure. Like reference numerals are used to designate like parts in the accompanying drawings.

DETAILED DESCRIPTION

The present disclosure relates to private key distribution, and more specifically, to providing private key distribution between endpoint instances used for generating and validating access tokens. While the present disclosure is not necessarily limited to such applications, various aspects of the disclosure may be appreciated through a discussion of various examples using this context.

A web API is a programmatic interface consisting of one or more publicly exposed endpoints. The exposed endpoints can be used by the web API to allow two systems to communicate with one another. The endpoints indicate how a resource or service is accessed. If a system wants to access a resource of another system, it must go through a designated endpoint offered by the web API.

A web API can use authorization endpoints to generate access tokens and distribute them to systems that are granted access to the web API. A system can use these access tokens in subsequent requests to be allowed access to resources and services offered by the web API. Access tokens typically come in the format of a JWT, which has digital signatures verifying the authenticity of the JWT. These signatures can be encrypted using asymmetric cryptography.

Asymmetric cryptography is a cryptographic system that uses key pairs. Key pairs include a public key and a private key. Public keys can be disseminated widely, and the private keys are only kept by the owner of the key. In this cryptographic system, any individual or system can encrypt a message using the public key, but that encrypted message can only be decrypted with the owner's private key. Key pairs can also be used to create a digital signature. A digital signature can be a set of algorithms and encryption protection used to determine the authenticity of a document or software.

Endpoints can operate within a service cluster to distribute Internet traffic coming into a web API. A service cluster can offer load balancing between instances and lower the latency between the web API and applications. Additionally, the web API has higher availability due to the redundancy offered by service clusters. If an instance goes offline or shutdowns, another instance can continue to perform the work requested.

When a service cluster is used as an authorization endpoint, several authorization instances are generated to perform the same task. These authorization instances can be dispersed locally, regionally, or globally to assist in lowering latency between an application and a web API. For an authorization instance to operate, it must be able to provide JWT access tokens to applications with the proper credentials. These access tokens include signatures that validate the access tokens. Signatures are encrypted using a signature key pair to provide security for the access token and ensure validity. A configuration file, including a private signature key, is distributed to each authorization instance within the service cluster. The authorization instances can use the private signature key to encrypt the signature portion of the access token before providing it to an authorized application.

Limitations on authorization instance security remain, however, as private signature keys are distributed in a configuration file to each authorization instance. These configuration files are stored in persistent storage. An attacker may be able to compromise an authorization instance and gain access to the machine's persistent storage. Once compromised, the attacker can copy the configuration file and extract the private signature key. The private signature key could then be used by the attacker to generate access tokens and gain access to resources provided by a web API.

Embodiments of the present disclosure may overcome the above and other problems by using a private key distribution system for distributing private signature keys between authorization instances. The private key distribution system includes a plurality of authorization instances participating in a common service. The common service performed by the authorization instances is to generate and provide access tokens to authorized applications. Each authorization instance is configured to generate host instance key pairs. An authorization instance is elected as a signature key leader instance that is configured to generate a signature key pair. The signature key leader instance is further configured to distribute the private signature key to each of the authorization instances when requested. The signature key leader instance is also configured to encrypt the private signature key using the public host key corresponding to the requesting authorization instance.

More specifically, the private key distribution system described herein elects a signature key leader instance from the authorization instances to generate and distribute a private signature key. An authorization instance can request the private signature key from the signature key leader instance. Upon receiving the request, the signature key leader instance can validate the request and encrypt the private signature key before transmitting it to the requesting authorization instance. The host instance key pairs used for encryption and decryption of the private signature key are specific to each authorization instance. Thus, only the requesting authorization instance can decrypt the private signature key. As such, the private key distribution system avoids using a configuration file to distribute the private signature key.

Additionally, or alternatively, once an authorization instance obtains a private signature key, it is stored in memory and not in persistent storage. If an authorization instance is shut down and restarted, it will need to generate a new host instance key pair and provide the public host key to the shared database. The authorization instance can then request the private signature key from the signature key leader instance since the key would have been lost at shutdown.

In some embodiments, the signature key leader instance takes additional verification steps to validate a requesting authorization instance before a private signature key is transmitted. A requesting authorization instance can detect that there is a new public signature key stored in the shared database and can request the corresponding private signature key from the signature key leader instance. When a request is made, the signature key leader instance can validate the request by examining a source Internet Protocol (IP) address of the request. If the IP address matches a known IP address of the requesting authorization instance, then the signature key leader instance can proceed with encrypting the private signature key and transmitting the encrypted key to the requesting authorization instance.

Additionally, or alternatively, the signature key leader instance can retrieve a registration relating to a requesting authorization instance from a configuration file used during the initialization of the authorization instance. The registration can include an IP address of the actual authorization instance. The signature key leader can then compare the IP address in the registration with the IP address provided in the request. This can assist in preventing attackers from spoofing their address to look like a legitimate authorization instance.

Additionally, or alternatively, the signature key leader instance can retrieve a registration relating to a requesting authorization instance from a configuration file updated during the initialization of the authorization instances. Using the hostname located in the registration, the signature key leader instance can use the hostname of the requesting authorization instance to transmit the encrypted private signature key. Transmission to a hostname provides an additional layer of security as an attacker would need to compromise both the shared database and the configuration file before they could compromise the entire system.

Embodiments of the present disclosure include the detection of an inactive signature key leader instance. A signature key leader instance can write to a key leader log stored in the shared database on a continuous interval. If an authorization instance detects that the signature key leader instance is no longer responsive or is no longer writing to the key leader log, then a new signature key leader instance can be elected. In some embodiments, a rollover of the signature key pair is performed when a new signature key leader instance is elected. Thus, the signature key pair used by the previous signature key leader is no longer valid, and the authorization instances will need to request the new private signature key from the new signature key leader instance.

Referring now to FIG. 1, shown is a block diagram illustrating a private key distribution system 100, in accordance with embodiments of the present disclosure. The private key distribution system 100 includes an endpoint 110, a shared database 130, a network 140, and a configuration file 150. The endpoint 110 includes an authorization instance 120-1, 120-2, 120-N (collectively "authorization instances 120), where N is a variable integer representing any number of possible authorization instances 120.

The endpoint 110 is a component of the private key distribution system configured to act as a communication channel between a server-side web API and other outside systems, in accordance with embodiments of the present disclosure. These outside systems include, but are not limited to, clients, applications, web browsers, other web APIs.

In some embodiments, the endpoint 110 operates within a service cluster. A cluster consists of multiple servers grouped to achieve a common service and can be regarded as a singular computer. These servers, or nodes, can provide users with a set of network resources, which are the nodes of the cluster. Clusters offer features that can improve scalability and offer high availability. For scalability, a service node in a cluster can dynamically add machines to increase the processing power of the cluster. For high availability, if a node in a cluster fails, the services running on this node can be taken over by other service nodes, thus enhancing the high availability of the cluster.

The nodes in the cluster can be defined as node instances. A node instance is a model element that represents an instantiation, or actual occurrence, of a node. Node instances are based on existing nodes. Node instances represent a specific and defined node in a system environment. These instances can be deployed to represent resources that exist at run time. For example, a node instance can represent a web server, a data server, an authorization server, and the like.

The authorization instances 120 are a component of the endpoint 110 configured to operate as a server instance for a web API, in accordance with embodiments of the present disclosure. The authorization instances 120 can operate as authorization servers, application servers, web servers, resource servers, and the like. In some embodiments, the authorization instances 120 provide access tokens to clients with authorized credentials and operate as an authorization server. The access tokens are strings representing the granted permissions given to a client. These access token can come in a JWT format. In some embodiments, the authorization instance operates as a resource server configured to perform digital signature operations.

The JWT format includes a header, a payload, and a signature. The header includes metadata about the type of access token and the cryptographic algorithms used to secure the contents. These cryptographic algorithms are typically keyed-hash message authentication code (HMAC) algorithms. HMAC algorithms include, but are not limited to, Secure Hash Algorithm 2 (SHA-2), Rivest-Shamir-Adleman (RSA), and JSON Web Algorithms (JWA). RSA algorithms can additionally be used to encrypt the signature portion of the JWT.

The payload includes a set of claims. The JWT specification defines standard fields commonly included in access tokens. Additionally, custom claims can also be included that are API-specific. The signature is used to validate the access token securely. The signature can be calculated by encoding the header and the payload using Base64url encoding and concatenating the two together with a period separator. The algorithm specified in the header and a private signature key 125 can be used to encrypt the signature.

The authorization instances 120 are further configured to generate a host instance key pair. The host instance key pair includes a private host key 127 and a public host key 128. The public host key 128 can be transmitted to the shared database 130 for storing. The host instance key pairs are unique to each authorization instance 120, and the private host key 127 can be stored in memory. The host instance key pairs are key pairs used in asymmetric cryptography. The public host instance key 128 can be used to encrypt a message (e.g., private signature key 125), and the private host instance key 127 can be used to decrypt the message.

The authorization instances 120 are further configured to elect a signature key leader instance. The signature key leader instance is one of the authorization instances 120 that is further configured to generate a signature key pair instance. The signature key pair includes a private signature key 125 and a public signature key 126. The signature key pair is unique from the host instance key pairs and is used to encrypt access tokens generated for clients. The private signature key 125 can be used to encrypt the signature in the access token, and the public signature key 126 can be used to verify the validity of the access token.

The signature key leader instance is further configured to encrypt the private signature key 125 using the public host key 128 corresponding to a requesting authorization instance 120. For example, an authorization instance 120 can request the private signature key 125 from the signature key leader instance. Upon receiving the request, the signature key leader instance can retrieve the requesting authorization instance's 120 public host key 128 stored in the shared database. Using the public host key 128, the signature key leader instance can encrypt the private signature key 125 before transmitting the private signature key to the requesting authorization instance 120.

In some embodiments, the signature key leader instance updates a key leader log 129 stored in the shared database 130 over an interval. For example, the signature key leader instance can update the key leader log 129 every thirty seconds, every minute, every two minutes, etc. The authorization instances 120 can read the key leader log to determine that the signature key leader instance is active and available for providing private signature keys.

The shared database 130 is a component of the private key distribution system 100 configured to store information relating to the private key distribution system 100, in accordance with embodiments of the present disclosure. While shown in FIG. 1 as a database, the shared database 130 can be a mapping, a table, journal, metadata, and the like. The shared database 130 can store public host instance keys from the host instance key pairs 127 generated by the authorization instances 120. Additionally, the shared database 130 can store the public signature key generated by the signature key leader instance and the key leader log.

The network 140 component of the private key distribution system 100 configured to facilitate direct, high-speed data transfers and communication between a client and the endpoint 110. Examples of the network 140 include a local area network (LAN), a wide area network (WAN), a storage area network (SAN), an intranet, or any combination thereof.

In some embodiments, the network 140 is the Internet. The Internet includes a global system of interconnected computer networks and devices that use common communication protocols, such as the transmission control protocol (TCP), user datagram protocol (UDP), and the internet protocol (IP) in the TCP/IP internet protocol suite.

The configuration file 150 is a component of the private key distribution system 100 configured to store and provide information relating to the authorization instances 120, in accordance with embodiments of the present disclosure. The configuration file 150 can store registrations for each of the authorization instances 120 initialized in the private key distribution system 100. In some embodiments, the registration is hardcoded in source code, such that the registration of the authorization instances cannot be altered.

It is noted that FIG. 1 is intended to depict the major representative components of the private key distribution system 100. In some embodiments, however, individual components may have greater or less complexity than as represented in FIG. 1, components other than or in addition to those shown in FIG. 1 may be present, and the number, type, and configuration of such components may vary.

Figure 2:
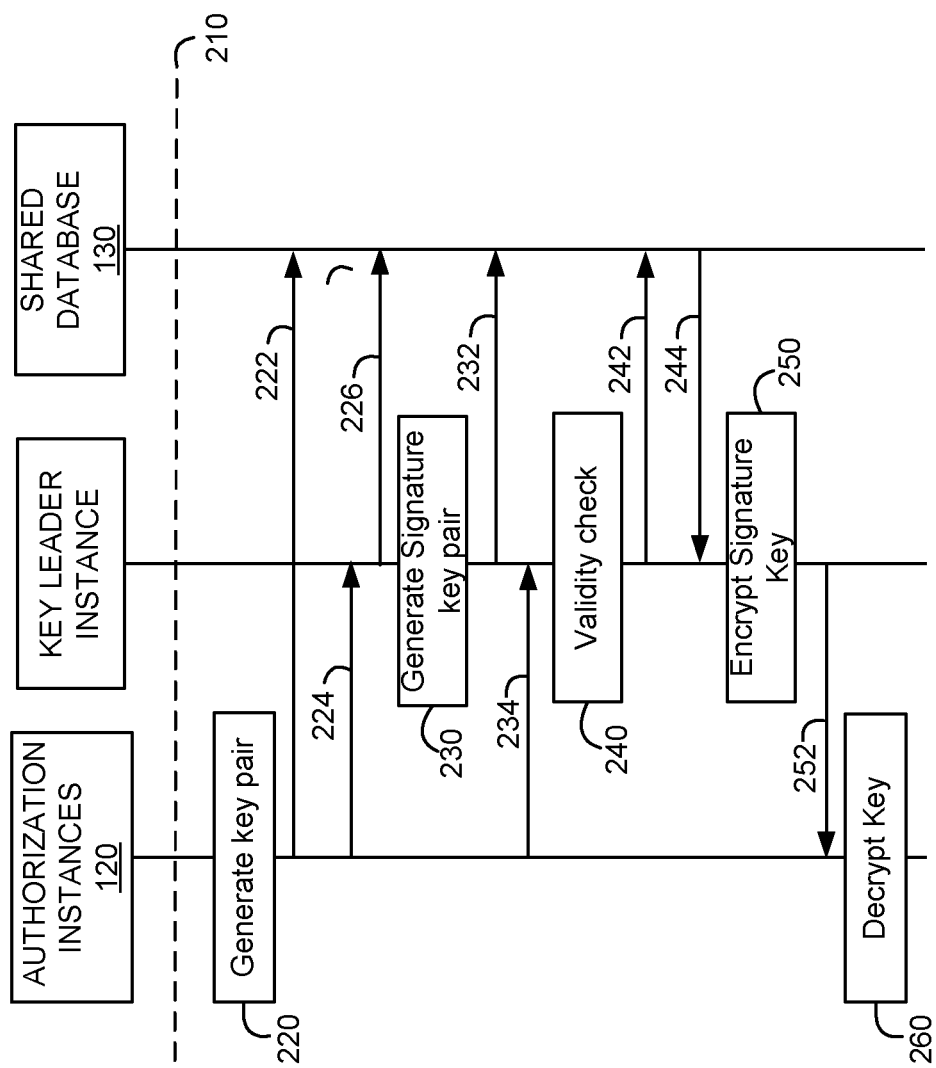
FIG. 2 is a data flow diagram illustrating a private key distribution between authorization instances, in accordance with embodiments of the present disclosure.

FIG. 2 is a data flow diagram 200 illustrating a private key distribution between authorization instances, in accordance with embodiments of the present disclosure. To illustrate data flow diagram 200, but not to limit embodiments, FIG. 2 is described within the context of the private key distribution system 100 of FIG. 1.

At operation 210, the authorization instances 120 are initialized and configured to perform a common service. During initialization, a configuration file 150 can store registrations for each authorization instance 120 initialized by the private key distribution system 100. The registration can include the IP address of the authorization instance 120 and act as a means of verification for the authorization instance 120. In some embodiments, the registration is hardcoded into source code that initializes the authorization instances 120.

At operation 220, each of the authorization instances 120 can generate a host instance key pair. The host instance key pairs include a private host key 127 and a public host key 128. The authorization instances 120 can transmit 222 their public host key 128 to the shared database 130. Detecting that no signature key leader instance is elected, the authorization instances can elect 224 a signature key leader instance from the initiated authorization instances. An authorization instance 120 can be elected as the signature key leader instance by being the first authorization instance 120 to make an entry 226 in the key leader log 129.

At operation 230, the signature key leader instance generates a signature key pair. The signature key pair includes a private signature key 125 and a public signature key 126.

Once generated, the signature key leader instance can transmit 232 the public signature key 126 to the shared database 130. Upon detecting that a public signature key 126 has been stored in the shared database 130, the authorization instances individually request 234 the private signature key from the signature key leader instance.

At operation 240, the signature key leader instance performs a validity check on the request 234 sent by a requesting authorization instance 120. This can include verifying that the IP address of the request matches the IP address of an authorization instance 120 known to be in a common service. The validity check can also come in the form of a callback to the requesting authorization instance transmitted. The signature key leader instance can respond to the request with an Ok response. The signature key leader instance can retrieve a hostname for the requesting authorization instance 120 from the configuration file 150 and use the hostname to perform a callback with the encrypted private signature key. Once verified as a valid request, the signature key leader instance requests 242 the public host key 128 relating to the requesting authorization instance 120. The shared database 130 can transmit 244 the public host key 128 corresponding to the requesting authorization instance 120 back to the signature key leader instance.

At operation 250, the signature key leader encrypts the private signature key 125 using the public host key 128 obtained from the shared database 130 and transmits 252 the encrypted private signature key to the requesting authorization instance 120. At operation 260, the requesting authorization instance 120 can decrypt the encrypted private signature key 125 using their private host key 127.

Figure 3:
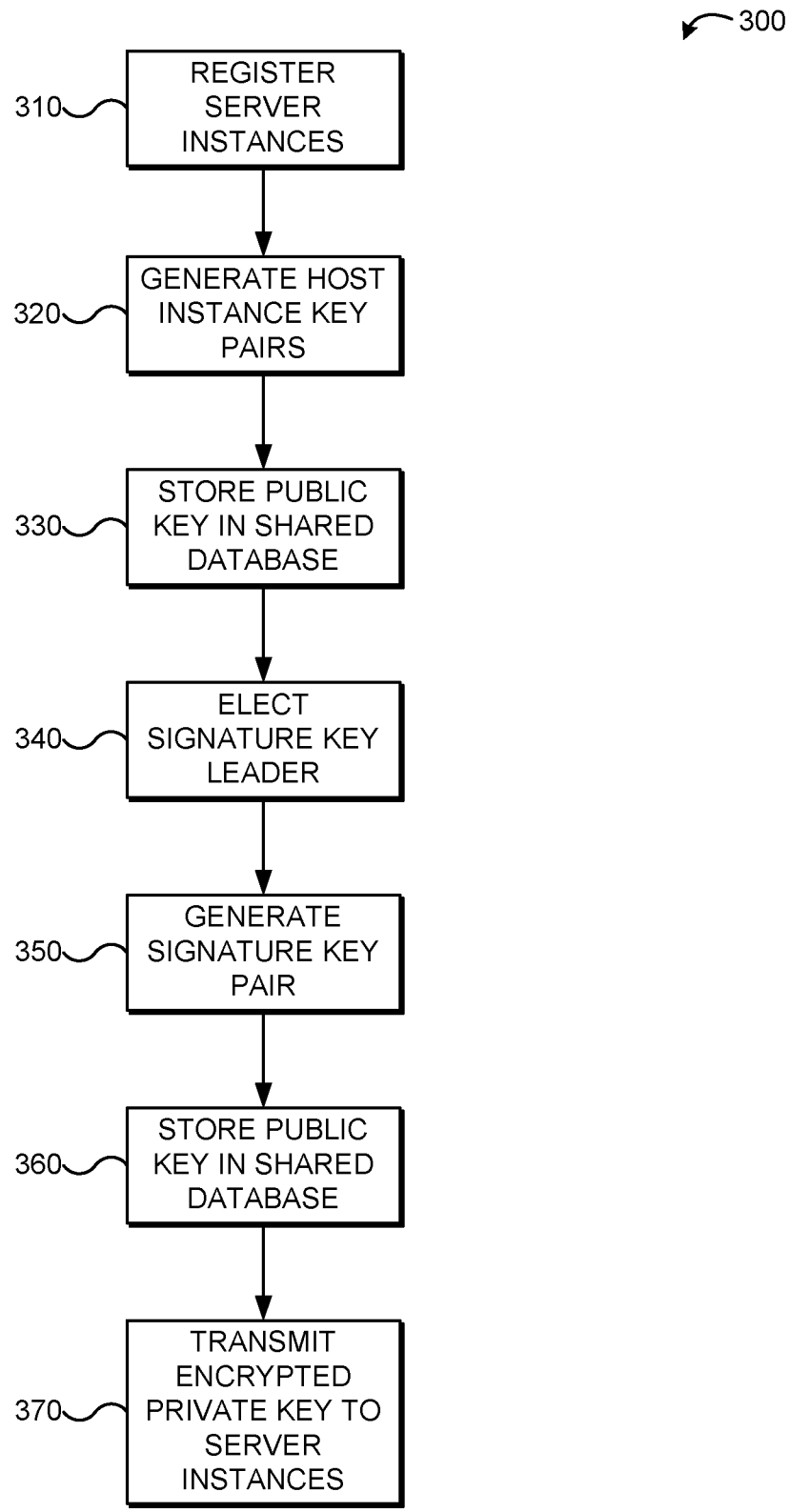
FIG. 3 is a flow chart of a private key distribution process, in accordance with embodiments of the present disclosure.

FIG. 3 is a flow diagram illustrating a process 300 for distributing a private signature key between authorization instances, in accordance with embodiments of the present disclosure. The process 300 may be performed by hardware, firmware, software executing on at least one processor, or any combination thereof. For example, any or all of the steps of the process 300 may be performed by one or more computing devices (e.g., computer system 500 of FIG. 5). To illustrate process 300, but not to limit embodiments, FIG. 3 is described within the context of the private key distribution system 100 of FIG. 1.

The process 300 begins by adding registrations for each authorization instances 120 configured to perform a common service into a configuration file 150. This is illustrated in step 310. The registration can include an instance identification assigned to each of the authorization instances 120 and an IP address of the authorization instances 120. The instance identification and/or the IP address can be used to verify authorization instances 120 in subsequent requests.

Each authorization instance 120 generates a host instance key pair. This is illustrated at step 320. The host instance key pair can be used to encrypt and decrypt the private signature key 126 used in the common service. The host instance key pairs can be used in asymmetric cryptography key techniques. These key techniques include, but are not limited to, Rivest-Shamir-Adleman (RSA), Diffie-Hellman, Elliptic-curve Diffie-Hellman (ECDH), Secure Remote Password Protocol (SRP), pre-shared key (PSK), Digital Signature Algorithm (DSA), Elliptic Curve DSA (ECDSA), RC4, Triple data encryption algorithm (Triple DES), Advanced Encryption Standard (AES), International Data Encryption Algorithm (IDEA), Data Encryption Standard (DES), Camellia, Hash-based MD5, and Secure Hash Algorithms (SHA) hash function.

Additionally, the host instance key pairs can be used in protocols using asymmetric key algorithms. This protocol include, but are not limited to, Secure/Multipurpose Internet Mail Extensions (S/MIME), GNU Privacy Guard (GPG), Internet Key Exchange, Pretty Good Privacy (PGP), composed of Z and Real-Time Transport Protocol (ZRTP), Transport Layer Security (TLS), and Secure Internet Live Conferencing Protocol (SILC).

The public host instance key 128 is stored in the shared database 130. This is illustrated in step 330. Each authorization instance 120 transmits their public host instance key 128 to the shared database 130. This allows for another component of the private key distribution system 100 to retrieve the public host instance key 128 and encrypt a message that only the corresponding authorization instance 120 can decrypt. The private host instance keys 127 are stored in the memory of the authorization instances 120. If an authorization instance 120 were to shut down, crash, or restart, the authorization instance 120 would need to regenerate a new host instance key pair and retransmit their public host key 128 to the shared drive.

A signature key leader instance is elected from out of the authorization instances 120 performing the common service. This is illustrated in step 340. The signature key leader instance can be elected when the first authorization instance 120 makes an entry into the key leader log 129. While acting as the signature key leader instance, the authorization instance 120 can update the key leader log at a set interval. For example, the signature key leader instance can update the key leader log 129 every minute to notify the other authorization instances 120 that the signature key leader instance has been elected and that they can provide the private signature key 125 to the other authorization instances 120.

In some embodiments, the signature key leader instance is initially a predetermined authorization instance 120. For example, the first authorization instance 120 to registered in the configuration file 150 can be elected as the first signature key leader instance. If the signature key leader instance 120 goes offline, then another authorization instance 120 can be elected as the signature key leader instance.

In some embodiments, another authorization instance 120 is elected as the signature key leader instance when the signature key leader instance stops updating the key leader log 129. For example, if the signature key leader instance does not update the signature key log 129 for over three minutes, then the first authorization instance 120 to write into the signature key log 129 is elected as the new signature key leader instance. The signature key leader log 129 can be read by the other authorization instances 120 as a way to notify them that a new signature key leader instance has been elected.

The signature key leader instance generates a signature key pair. This is illustrated in step 350. The signature key pair includes a private signature key 125 and a public signature key 126. The authorization instances 120 can use the same private signature key 125 to encrypt the signature when generating access tokens for clients. By having one private signature key 125, the private key distribution system 100 minimizes the overhead that can occur when utilizing multiple signature key pairs.

The signature key pair can be used in various digital signature algorithms. These algorithms include, but are not limited to, RSA Probabilistic Signature Scheme (RSA-PSS), ECDSA, Edwards-curve Digital Signature Algorithm (EdDSA), ElGamal signature scheme, Rabin signature algorithm, and Aggregate signature.

The public signature key 126 is stored in the shared database 130. This is illustrated in step 360. The signature key leader instance transmits the generated public signature key 126 to the shared database 130. This allows for the web API and applications to retrieve the public signature key 126 and validate access tokens signed using the private signature key. If signature key leader instance were to shut down or restart, before storing the public signature key 126, then another authorization instance 120 would need to be elected and repeat the process of generating a new signature key pair and storing the new public signature key 126 in the shared database 130.

The signature key leader transmits an encrypted private signature key to a requesting authorization instance 120. This is illustrated at step 370. The signature key leader instance can utilize the public host keys 128 stored in the shared database 130 to encrypt the private signature key for each corresponding authorization instance 120. Upon receiving a request for the private signature key 125, the signature key leader instance can transmit the encrypted private signature key 125 to the requesting authorization instance 120. By encrypting the private signature key 125 with the public host instance key 128 corresponding to the requesting authorization instance 120, only the requesting authorization instance 120 can decrypt the private signature key 126.

Figure 4:
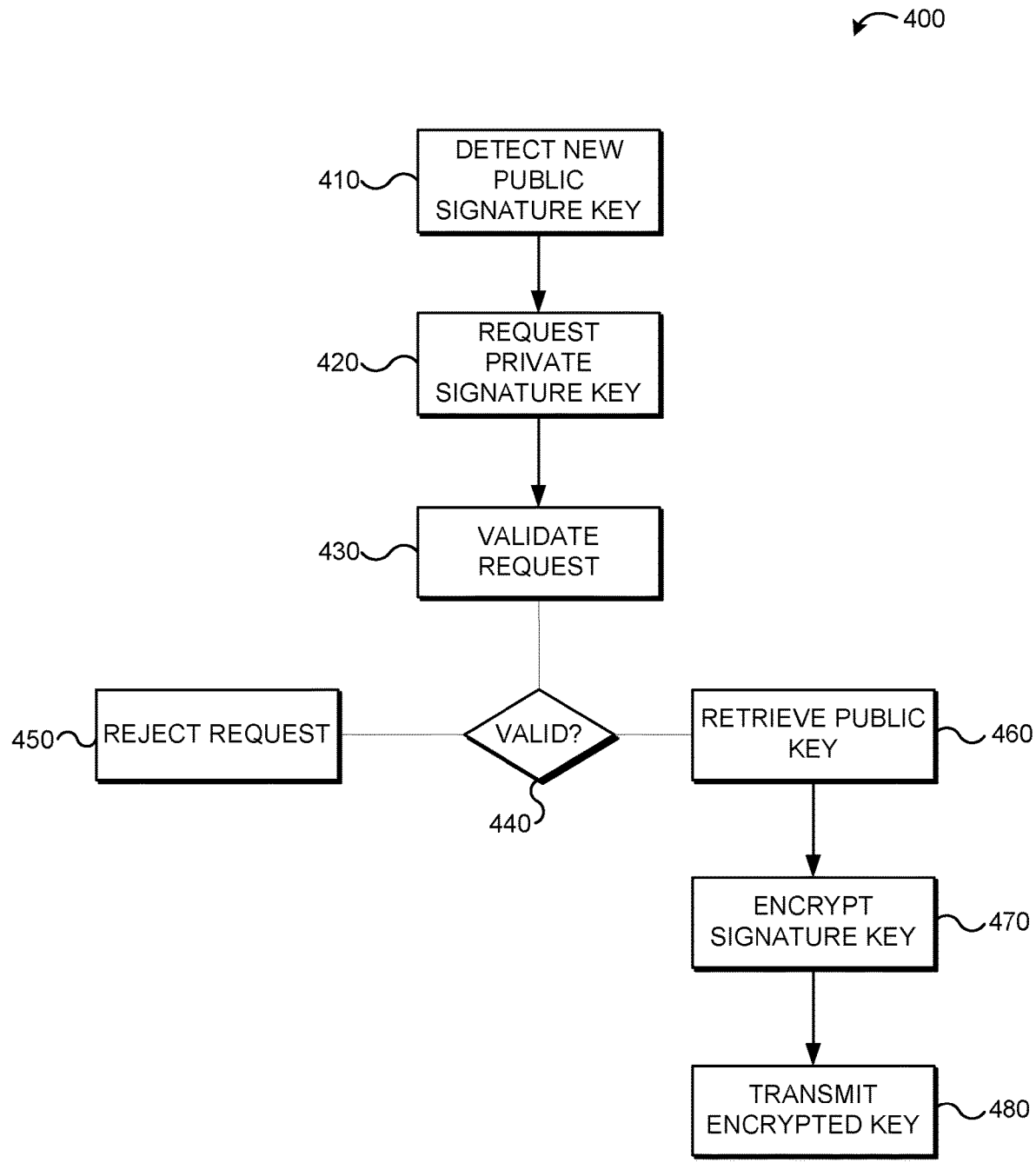
FIG. 4 is a flow chart of a private key request process, in accordance with embodiments of the present disclosure.

FIG. 4 is a flow diagram illustrating a process 400 for transmitting an encrypted private signature key to an authorization instance (e.g., step 370 of process 300 in FIG. 3), in accordance with embodiments of the present disclosure. The process 400 may be performed by hardware, firmware, software executing on at least one processor, or any combination thereof. For example, any or all of the steps of the process 400 may be performed by one or more computing devices (e.g., computer system 500 of FIG. 5). To illustrate process 400, but not to limit embodiments, FIG. 4 is described within the context of the private key distribution system 100 of FIG. 1.

An authorization instance 120 detects a public signature key 126 stored in the shared database 130. This is illustrated in step 410. A public signature key 126 detected in the shared database can indicate to the authorization instance 120 that a private signature key 125 can be requested from the signature key leader instance.

In some embodiments, an authorization instance 120 detects a new public signature key 126 stored in the shared database 130. This can be detected by examining the public signature key 126 or by an indication noted in the key leader log 129 that a new public signature key 126 had been transmitted. A new signature key pair can be generated, often called a key rollover, by a signature key leader instance after a predetermined time set by an administrator. For example, a key rollover can occur every week, every month, every six weeks, etc. In some embodiments, a key rollover occurs when a new signature key leader instance is elected.

The authorization instance 120 requests the private signature key 125 from the signature key leader instance. This is illustrated in step 420. The authorization instance can transmit a request command to the signature key leader instance that includes and IP address of the requesting authorization instance 120.

Upon receiving the request, the signature key leader instance validates the request. This is illustrated in step 430. In some embodiments, the signature key leader instance retrieves a registration relating to the requesting authorization instance 120 from a configuration file 150 used during the initialization of the authorization instances 120. The registration can include the authorization instance 120 identification and their IP address. The signature key leader instance can verify that the source IP address of the request matches the stored IP address of the requesting authorization instance located in the registration.

In some embodiments, the signature key leader instance retrieves the registration relating to the requesting authorization instance 120 from a configuration file 150 used during the initialization of the authorization instances 120. The signature key leader instance can locate a hostname found in the registration. The signature key leader instance can transmit the encrypted private signature key to the hostname of the requesting authorization instance.

A determination is made as to whether or not the request made by the requesting authorization instance 120 is valid or not. This is illustrated at step 440. If the signature key leader instance determines that the request could not be validated, then the request is rejected. This is illustrated at step 450. However, if the signature key leader instance can validate the request, then the process 400 proceeds to step 460.

The private signature key leader instance retrieves the public host key 128 from the shared database that corresponds with the requesting authorization instance 120. This is illustrated at step 460. The public host key 128 can then be used by the signature key leader instance to encrypt the private signature key. This is illustrated at step 470. Once encrypted, the encrypted private signature key can be transmitted to the requesting authorization instance 120. This is illustrated at step 480.

Figure 5:
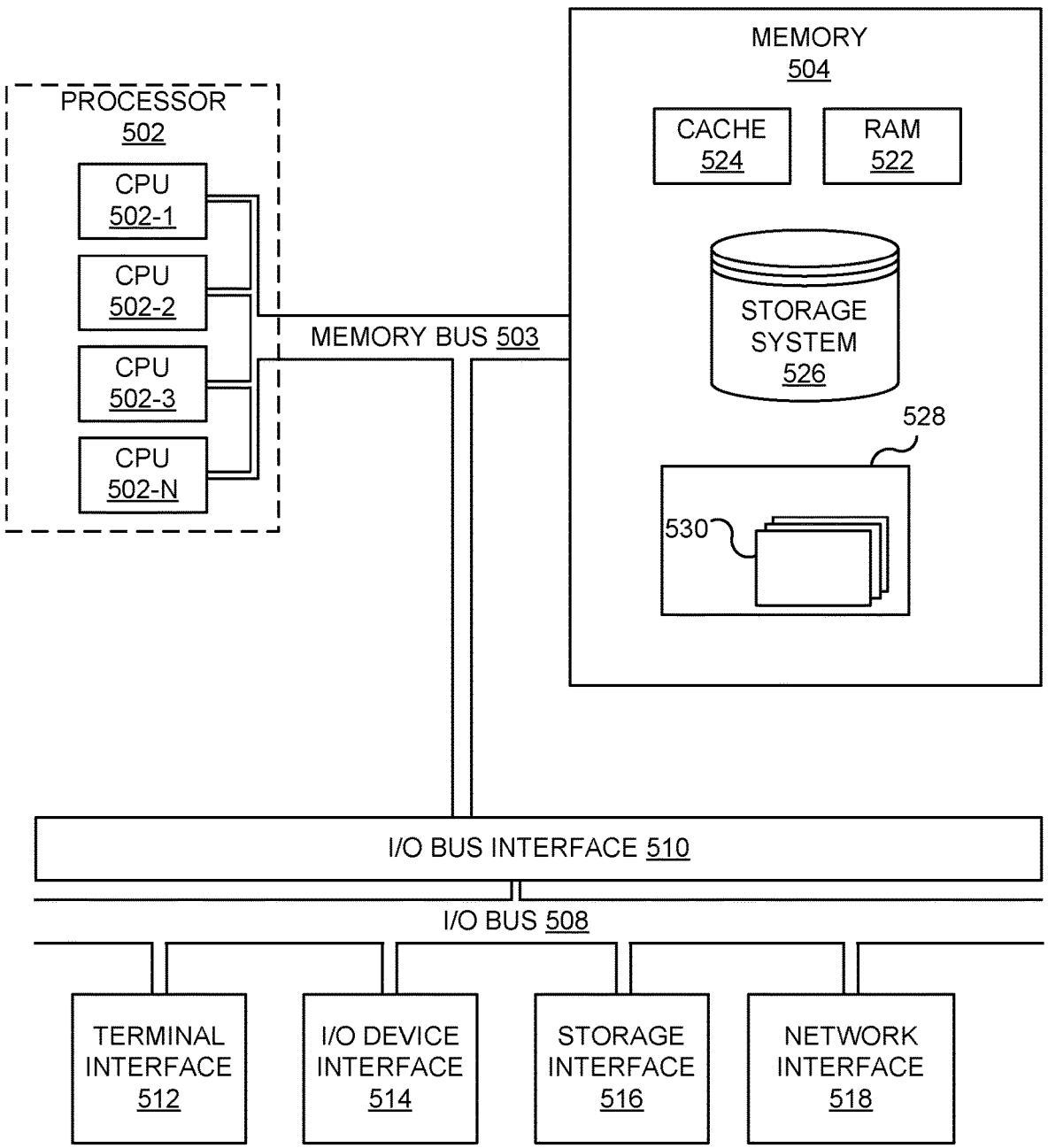
FIG. 5 is a high-level block diagram illustrating an example computer system that may be used in implementing one or more of the methods, tools, and modules, and any related functions, described herein, in accordance with embodiments of the present disclosure.

Referring now to FIG. 5, shown is a high-level block diagram of an example computer system 500 (e.g., the private key distribution system 100) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 500 may comprise one or more processors 502, a memory 504, a terminal interface 512, a I/O (Input/Output) device interface 514, a storage interface 516, and a network interface 518, all of which may be communicatively coupled, directly or indirectly, for inter-component communication via a memory bus 503, a I/O bus 508, and an I/O bus interface 510.

The computer system 500 may contain one or more general-purpose programmable central processing units (CPUs) 502-1, 502-2, 502-3, and 502-N, herein generically referred to as the processor 502. In some embodiments, the computer system 500 may contain multiple processors typical of a relatively large system; however, in other embodiments, the computer system 500 may alternatively be a single CPU system. Each processor 501 may execute instructions stored in the memory 504 and may include one or more levels of on-board cache.

The memory 504 may include computer system readable media in the form of volatile memory, such as random-access memory (RAM) 522 or cache memory 524. Computer system 500 may further include other removable/non-removable, volatile/non-volatile computer system storage media. By way of example only, storage system 526 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. Also, the memory 504 can include flash memory, e.g., a flash memory stick drive or a flash drive. Memory devices can be connected to memory bus 503 by one or more data media interfaces. The memory 504 may include at least one program product having a set (e.g., at least one) of program modules that are configured to carry out the functions of various embodiments.

Although the memory bus 503 is shown in FIG. 5 as a single bus structure providing a direct communication path among the processors 502, the memory 504, and the I/O bus interface 510, the memory bus 503 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 500 may, in some embodiments, contain multiple I/O bus interface units, multiple I/O buses, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 500 may be a multi-user mainframe computer system, a single-user system, or a server computer or similar device that has little or no direct user interface but receives requests from other computer systems (clients). Further, in some embodiments, the computer system 500 may be implemented as a desktop computer, portable computer, laptop or notebook computer, tablet computer, pocket computer, telephone, smartphone, network switches or routers, or any other appropriate type of electronic device.

It is noted that FIG. 5 is intended to depict the representative major components of an exemplary computer system 500. In some embodiments, however, individual components may have greater or lesser complexity than as represented in FIG. 5, components other than or in addition to those shown in FIG. 5 may be present, and the number, type, and configuration of such components may vary.

One or more programs/utilities 528, each having at least one set of program modules 530 may be stored in memory 504. The programs/utilities 528 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 528 and/or program modules 530 generally perform the functions or methodologies of various embodiments.

It is to be understood that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer can deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Figure 6:
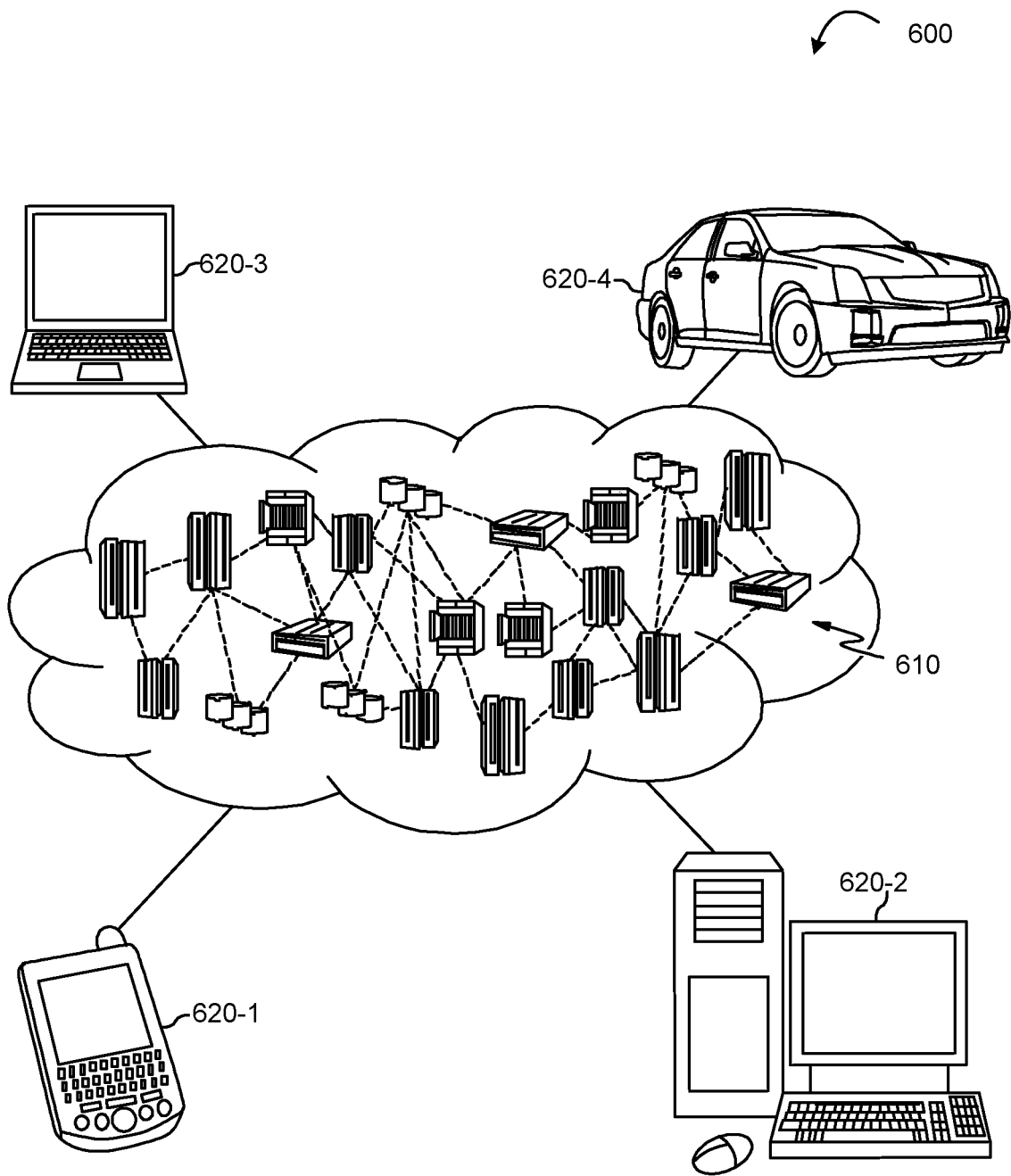
FIG. 6 depicts a cloud computing environment, in accordance with embodiments of the present disclosure.

Referring now to FIG. 6, illustrative cloud computing environment 600 is depicted. As shown, cloud computing environment 600 includes one or more cloud computing nodes 610 with which local computing devices used by cloud consumers, such as, for example, personal digital assistant (PDA) or cellular telephone 620-1, desktop computer 620-2, laptop computer 620-3, and/or automobile computer system 620-4 may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 620-1 to 620-4 shown in FIG. 6 are intended to be illustrative only and that computing nodes 610 and cloud computing environment 600 can communicate with any type of computerized device over any type of network and/or network addressable connection (e.g., using a web browser).

Figure 7:
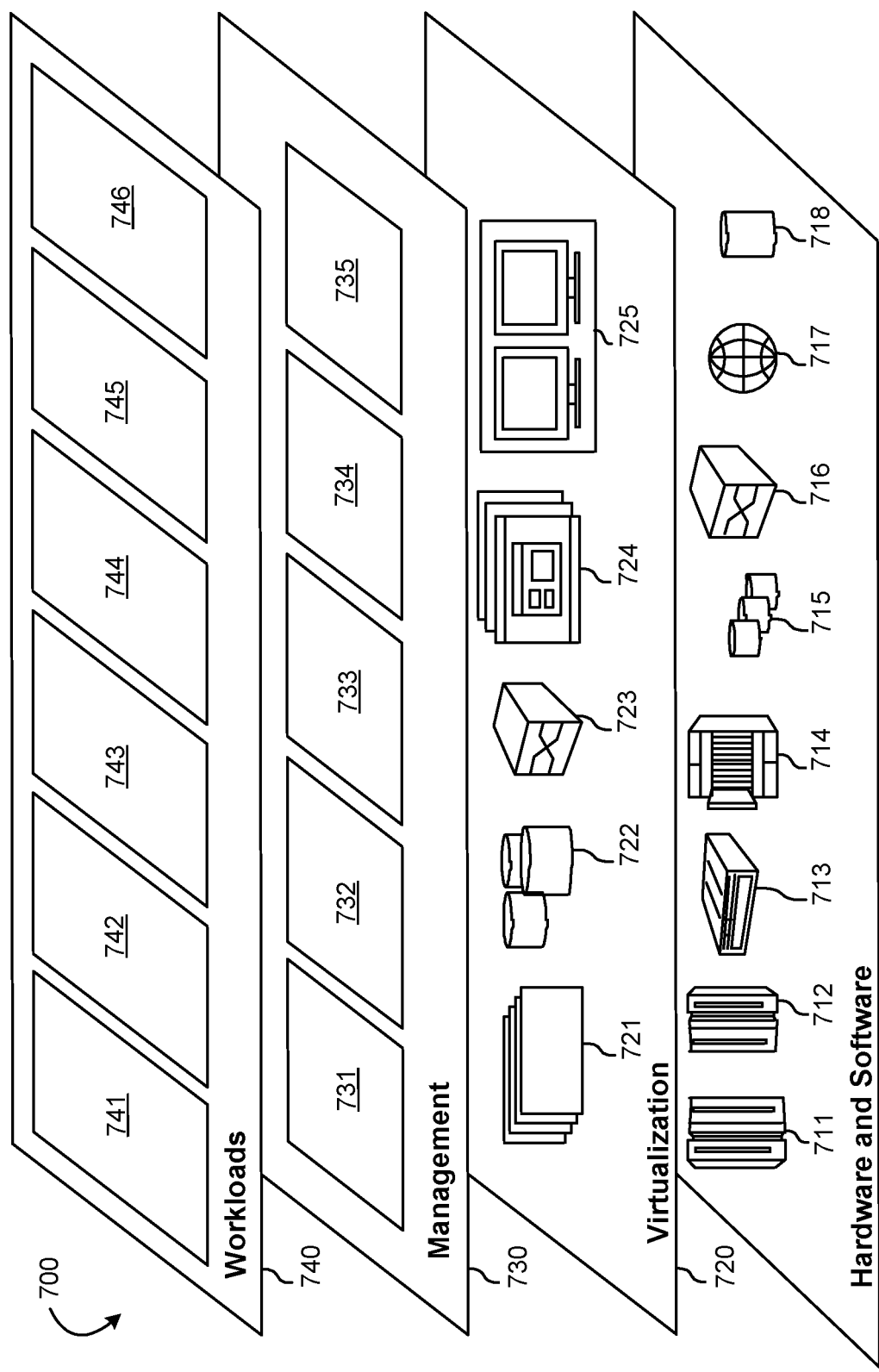
FIG. 7 depicts abstraction model layers, in accordance with embodiments of the present disclosure.

Referring now to FIG. 7, a set of functional abstraction layers 700 provided by cloud computing environment 600 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 710 includes hardware and software components. Examples of hardware components include mainframes 711; RISC (Reduced Instruction Set Computer) architecture-based servers 712; servers 713; blade servers 714; storage devices 715; and networks and networking components 716. In some embodiments, software components include network application server software 717 and database software 718.

Virtualization layer 720 provides an abstraction layer from which the following examples of virtual entities may be provided: virtual servers 721; virtual storage 722; virtual networks 723, including virtual private networks; virtual applications and operating systems 724; and virtual clients 725.

In one example, management layer 730 may provide the functions described below. Resource provisioning 731 provides dynamic procurement of computing resources and other resources that are utilized to perform tasks within the cloud computing environment. Metering and Pricing 732 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 733 provides access to the cloud computing environment for consumers and system administrators. Service level management 734 provides cloud computing resource allocation and management such that required service levels are met. Service Level Agreement (SLA) planning and fulfillment 735 provide pre-arrangement for, and procurement of, cloud computing resources for which a future requirement is anticipated in accordance with an SLA.

Workloads layer 740 provides examples of functionality for which the cloud computing environment may be utilized. Examples of workloads and functions which may be provided from this layer include mapping and navigation 741; software development and lifecycle management 742 (e.g., the private key distribution system 100); virtual classroom education delivery 743; data analytics processing 744; transaction processing 745; and precision cohort analytics 746.

The present invention may be a system, a method, and/or a computer program product at any possible technical detail level of integration. The computer program product may include a computer-readable storage medium (or media) having computer readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer-readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or another device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for distributing a private signature key between authorization instances, the computer-implemented method comprising:
   registering a plurality of authorization instances in a configuration file by providing a registration to the configuration, the authorization instances participating in a common service;
   generating host instance key pairs for each of the authorization instances, wherein each of the host instance key pairs include a public host key and a private host key;
   storing the public host keys in a shared database;
   electing one of the authorization instances to be a signature key leader instance;
   generating, by the signature key leader instance, a signature key pair, wherein the signature key pair includes a public signature key and a private signature key;
   storing the public signature key in the shared database;
   transmitting an encrypted private signature key to a requesting authorization instance of the authorization instances, wherein the private signature key is encrypted using the public host key corresponding to the requesting authorization instance; and
   decrypting, by the requesting authorization instance, the encrypted private signature key using the private host key generated by the requesting authorization instance.

2. The computer-implemented method of claim 1, wherein transmitting the encrypted private signature key comprises:
   detecting, by the requesting authorization instance, the public signature key stored in the shared database;
   requesting, by the requesting authorization instance, the private signature key from the signature key leader instance;
   validating the request made to the signature key leader instance by examining a source IP address of the request;
   retrieving, upon validating the request, the public host key corresponding to the requesting authorization instance from the shared database;
   encrypting the private signature key using the public host key; and
   transmitting the encrypted private signature key to the requesting authorization instance.

3. The computer-implemented method of claim 2, wherein validating the request comprises:
   retrieving a registration relating to the requesting authorization instance from the configuration file; and
   verifying the source IP address of the request matches a stored IP address of the requesting authorization instance located in the registration.

4. The computer-implemented method of claim 2, further comprising:
   retrieving a registration for the requesting authorization instance from the configuration file, the registration includes a hostname of the requesting authorization instance;
   providing the encrypted private signature key via a callback at the hostname of the requesting authorization instance.

5. The computer-implemented method of claim 1, further comprising:
   detecting the signature key leader instance is no longer responsive; and
   electing a new signature key leader instance from the authorization instances.

6. The computer-implemented method of claim 5, further comprising:
   performing a rollover of the signature key pair to generate a new signature key pair; and
   adding a new public signature key to the shared database.

7. The computer-implemented method of claim 1, wherein the signature key pair is stored in memory of the signature key leader instance.

8. A non-transitory computer-readable storage medium having stored thereon instruction for controlling a computer system to:
   register a plurality of authorization instances in a configuration file by providing a registration to the configuration, the authorization instances participating in a common service;
   generate host instance key pairs for each of the authorization instances, wherein each of the host instance key pairs include a public host key and a private host key;
   store the public host keys in a shared database;
   elect one of the authorization instances to be a signature key leader instance;
   generate a signature key pair by the signature key leader instance, wherein the signature key pair includes a public signature key and a private signature key;
   store the public signature key in the shared database; and
   transmit an encrypted private signature key to a requesting authorization instance of the authorization instances, wherein the private signature key is encrypted using the public host key corresponding to the requesting authorization instance to generate the encrypted private signature key.

9. The non-transitory computer-readable storage medium of claim 8, wherein transmit the encrypted private signature key comprises instructions to cause the computer system to:
   detect, by the requesting authorization instance, the public signature key in the shared database;

request, by the requesting authorization instance, the
private signature key from the signature key leader
instance;
validate the request made to the signature key leader
instance by examining a source IP address of the
request;
retrieve, upon validating the request, the public host key
corresponding to the requesting authorization instance
from the shared database;
encrypt the private signature key using the public host
key; and
transmit the encrypted private signature key to the
requesting authorization instance.

10. The non-transitory computer-readable storage medium of claim 9, wherein validate the request comprises instructions to cause the computer system to:
retrieve a registration for the requesting authorization instance from the configuration file; and
verify the source IP address of the request matches a stored IP address of the requesting authorization instance located in the registration.

11. The non-transitory computer-readable storage medium of claim 9, further comprising instructions to cause the computer system to:
retrieve a registration for the requesting authorization instance from the configuration file, the registration includes a hostname of the requesting authorization instance;
provide the encrypted private signature key via a callback at the hostname of the requesting authorization instance.

12. The non-transitory computer-readable storage medium of claim 8, further comprising instructions to cause the computer system to:
detect the signature key leader instance being no longer responsive; and
elect a new signature key leader instance from the authorization instances.

13. The non-transitory computer-readable storage medium of claim 12, further comprising instructions to cause the computer system to:
perform a rollover of the signature key pair to generate a new signature key pair; and
add a new public signature key to the shared database.

14. The non-transitory computer-readable storage medium of claim 8, wherein the signature key pair is stored in memory of the signature key leader instance.

15. A computer system for distributing a private signature key between authorization instances, the computer system comprising:
a data processing component;
a physical memory; and
local data storage having stored thereon computer executable program code, which when executed by the data processing component causes the data processing component to:
register a plurality of authorization instances in a configuration file by providing a registration to the configuration, the authorization instances participating in a common service;
generate host instance key pairs for each of the authorization instances, wherein each of the host instance key pairs include a public host key and a private host key;
store the public host keys in a shared database;
elect one of the authorization instances to be a signature key leader instance;
generate a signature key pair by the signature key leader instance, wherein the signature key pair includes a public signature key and a private signature key;
store the public signature key in the shared database; and
transmit an encrypted private signature key to a requesting authorization instance of the authorization instances, wherein the private signature key is encrypted using the public host key corresponding to the requesting authorization instance to generate the encrypted private signature key.

16. The computer system of claim 15, wherein transmit the encrypted private signature key causes the data processing component to:
detect, by the requesting authorization instance, the public signature key in the shared database;
request, by the requesting authorization instance, the private signature key from the signature key leader instance;
validate the request made to the signature key leader instance by examining a source IP address of the request;
retrieve, upon validating the request, the public host key corresponding to the requesting authorization instance from the shared database;
encrypt the private signature key using the public host key; and
transmit the encrypted private signature key to the requesting authorization instance.

17. The computer system of claim 16, wherein validate the request causes the data processing component to:
retrieving a registration for the requesting authorization instance from the configuration file; and
verifying the source IP address of the request matches a stored IP address of the requesting authorization instance located in the registration.

18. The computer system of claim 16, further comprising:
retrieve a registration for the requesting authorization instance from the configuration file, the registration includes a hostname of the requesting authorization instance;
provide the encrypted private signature key via a callback at the hostname of the requesting authorization instance.

19. The computer system of claim 15 further comprising:
detect the signature key leader instance being no longer responsive; and
elect a new signature key leader instance from the authorization instances.

20. The computer system of claim 19, further comprising:
perform a rollover of the signature key pair to generate a new signature key pair; and
add a new public signature key to the shared database.

* * * * *